US007581186B2

(12) United States Patent
Dowdy et al.

(10) Patent No.: US 7,581,186 B2
(45) Date of Patent: Aug. 25, 2009

(54) MEDIA MANAGER WITH INTEGRATED BROWSERS

(75) Inventors: Thomas Dowdy, Sunnyvale, CA (US); David Heller, San Jose, CA (US); Anne Jones, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 11/519,460

(22) Filed: Sep. 11, 2006

(65) Prior Publication Data

US 2008/0066016 A1 Mar. 13, 2008

(51) Int. Cl.
*G06F 3/16* (2006.01)
(52) U.S. Cl. ...................................... 715/727
(58) Field of Classification Search ................. 715/716, 715/727, 715, 848
See application file for complete search history.

(56) References Cited

U.S. PATENT DOCUMENTS

| | | | |
|---|---|---|---|
| 5,303,388 | A | 4/1994 | Kreitman et al. |
| 5,345,543 | A | 9/1994 | Capps et al. |
| 5,396,590 | A | 3/1995 | Kreegar |
| 5,452,414 | A | 9/1995 | Rosendahl et al. |
| 5,864,868 | A | 1/1999 | Contois |
| 6,006,227 | A | 12/1999 | Freeman et al. |
| 6,346,951 | B1* | 2/2002 | Mastronardi ................ 715/716 |
| 6,638,313 | B1 | 10/2003 | Freeman et al. |
| 6,725,427 | B2 | 4/2004 | Freeman et al. |
| 6,768,999 | B2 | 7/2004 | Prager et al. |
| 7,085,590 | B2 | 8/2006 | Kennedy et al. |
| 2001/0015719 | A1 | 8/2001 | Van Ee et al. |
| 2002/0030699 | A1 | 3/2002 | Van Ee |
| 2002/0113824 | A1 | 8/2002 | Myers |
| 2004/0013416 | A1* | 1/2004 | Mok ........................ 386/125 |
| 2004/0199582 | A1 | 10/2004 | Kucharewski et al. |
| 2006/0195790 | A1* | 8/2006 | Beaupre et al. ............. 715/727 |
| 2007/0044036 | A1* | 2/2007 | Ishimura et al. ............. 715/810 |
| 2008/0036743 | A1 | 2/2008 | Westerman et al. |
| 2008/0062141 | A1 | 3/2008 | Chaudhri |
| 2008/0066135 | A1 | 3/2008 | Brodersen et al. |

FOREIGN PATENT DOCUMENTS

| | | |
|---|---|---|
| EP | 1677497 A1 | 7/2006 |
| WO | 2006/013485 A2 | 2/2006 |
| WO | WO 2006/020305 | 2/2006 |

OTHER PUBLICATIONS

Rose, M., "Music in the Home: Interfaces for Music Applications", Personal Technologies, v., 4, No. 1, 2000, pp. 45-53.
Hinze, Cody., "Cover Flow—A Beautiful Way to Browse your MP3s", Noise Magazine Blog, Feb. 5, 2006, pp. 1-2.
Enright A C., "Dissatisfaction Sows Innovation—Visual Browsing in iTunes", Internet Blog of Andrew Coulter Enright, Dec. 29, 2004, pp. 1-6.
International Search Report and Written Opinion dated Feb. 12, 2008, from International Application No. PCT/US2007/078052.
"CoverFlow", www.steelskies.com/coverflow/, downloaded Jun. 15, 2006, pp. 1-2.

(Continued)

*Primary Examiner*—Thanh T Vu

(57) ABSTRACT

Methods and systems that improve the way media is played, sorted, modified, stored and cataloged are disclosed. One aspect relates to a browse window that allows a user to navigate through and select images that are related to media items. Another aspect relates to a graphical user interface of a media management program that utilizes multiple browse windows. Another aspect relates to simultaneously displayed media browse windows whose operations are integrated together so that the content shown therein is automatically synched when selections are made. Another aspect relates to resetting browsed content to the currently playing media.

40 Claims, 7 Drawing Sheets

OTHER PUBLICATIONS

"CoverFlow—Features", www.steelskies.com/coverflow/features.php, downloaded Jun. 15, 2006, p. 1.
"CoverFlow—FAQ & Tips", www.steelskies.com/coverflow/faq.php, downloaded Jun. 15, 2006, pp. 1-3.
Website printout, www.steelskies.com, downloaded Jun. 15, 2006, pp. 1-4.
"CoverFlow—Download", www.steelskies.com/coverflow/downloaded.php, downloaded Jun. 15, 2006, pp. 1-4.
Enright, "Dissatisfaction Sows Innovation", The Treehouse + The Cave, Dec. 29, 2004, 1-4 pgs.
Enright, "Meet CoverFlow", The Treehouse + The Cave, Aug. 13, 2005, 1-2 pgs.
Sawyer, "Get with the CoverFlow", The Olive Press, Dec. 8, 2005, 1 pg.
Enright, "Visual Browsing on a iBook DS", The Treehouse + The Cave, Dec. 29, 2004, 1 pg.
U.S. Appl. No. 12/215,651, entitled "Electronic Device with Image Based Browers", filed Jun. 26, 2008.
International Preliminary Report on Patentability for PCT/US2007/078180 mailed Mar. 26, 2009.
International Preliminary Report on Patentability for PCT/US2007078052 mailed Mar. 26, 2009.

* cited by examiner

MEDIA MANAGER WITH INTEGRATED BROWSERS

BACKGROUND OF THE INVENTION

1. Field of the Invention

The present invention relates generally to media management. More particularly, the present invention relates to browsing through media content. Even more particularly, the present invention relates to browsing media content with multiple browsers whose operations are synched.

2. Description of the Related Art

Personal computers typically include media management programs for managing various media such as music and videos. The media management programs typically utilize a graphical user interface that allows a user to play, sort, modify, store and catalog their media. The graphical user interface typically includes a text based browse window that allows a user to browse through and select a particular media track. The media management program may also be linked with an online media store so that new media can be bought and transferred to the personal computer and subsequently managed by the media management program. One example of a media management program is iTunes manufactured by Apple Computer of Cupertino, Calif.

While a single text based browse window is sufficient, there is still a desire for improved methods and systems for browsing through media items. For example, a single browse window may be limiting to user's who desire to browse through more than one media group at a given time. Furthermore, in some cases, finding a desired media item can be difficult when browsing through rows and rows of text. Therefore, improved methods and systems for browsing through media items are desired.

SUMMARY OF THE INVENTION

The invention relates, in one embodiment, to a graphical user interface produced by a media application program. The graphical user interface includes an application window generated by the media application program. The application window concurrently includes a first browse window and a second browse window. The first browse window displays descriptive information regarding a media file in a browser like manner. The second browse window displays images associated with one or more media files in a browser like manner. The content shown in the first and second browse windows are automatically synched when selections are made in the first and second browse windows.

The invention relates, in another embodiment, to a method of operating integrated browser windows. The method includes providing first and second browser windows. Each of the browse windows providing a different way of browsing through media content. The method also includes synching the first browser window with the second browser window when media content is selected in the second browser window. The method further includes synching the second browser window with the first browser window when content is selected in the first browser window.

The invention relates, in another embodiment, to a method of operating integrated browser windows. The method includes presenting a first browser window and a second browser window. The first browser window contains a list of media tracks. The second browser window contains a group of images. The method also includes moving the rows of media tracks across a viewing area of the first browse window in accordance with the navigation command. The method further includes playing a media file associated with a selected media track. The method additionally includes determining the image associated with the selected media track Moreover, the method includes updating the images of the second browser window based on the selected media track.

The invention relates, in another embodiment, to a method of operating integrated browser windows. The method includes presenting a first browser window and a second browser window. The first browser window contains a list of media tracks. The second browser window contains a group of images. The method also includes moving the images across a viewing area in accordance with a navigation command. The method further includes determining the media tracks and the order of media tracks associated with a selected image. The method additionally includes playing the media file associated with the first media track from the ordered group of media tracks. Moreover, the method includes updating the first browser window based on the selection.

The invention relates, in another embodiment, to a method of operating integrated browser windows. The method includes playing a media file and providing updated first and second browser windows. The first browser window contains a list of media tracks. The second browser window contains a plurality of images that are associated with one or more media tracks of the first browser window. The method also includes in the second browser window transitioning images across a viewing area in accordance with a navigation command. The method further includes starting a timer each time the second browser window stops transitioning through the images. The method additionally includes if a select command has been made at the second browser window during the timer, closing the timer, playing a new media file associated with the selection, and updating the first and second browsers based on the selection. Moreover, the method includes transitioning the images in the second browser window back to the image associated with the media file being currently played when the timer ends.

BRIEF DESCRIPTION OF THE DRAWINGS

The invention may best be understood by reference to the following description taken in conjunction with the accompanying drawings in which.

DETAILED DESCRIPTION OF THE INVENTION

The invention generally pertains to methods and systems that improve the way media is played, sorted, modified, stored and cataloged. One aspect of the invention relates to a browse window that allows a user to navigate through and select images that are related to media items. The images may for example be album art and the media items may be songs on the album. In one embodiment, the browse window may be configured to mimic turning pages or flipping through LP records or CD's in a bin. The image based browser window may be suitable for browsing content stored locally at a device and browsing content stored remotely at an online media store.

Another aspect of the invention relates to a graphical user interface of a media management program that utilizes multiple browse windows. The user can therefore select how they desire to browse for media content. In some cases, the windows may be displayed simultaneously so that the user can go back and forth between browse windows. In one embodiment, the GUI includes a first media browse window that operates textually allowing a user to browse through media tracks with sortable fields and a second media browse window that allows a user to flip through images associated with the media tracks.

Another aspect of the invention relates to simultaneously displayed media browse windows whose operations are integrated together so that the content shown therein is automatically synched when selections are made. User selections in one media browser is automatically reflected in the other media browser. For example, when a media track is selected in a text based media browse window, an image associated therewith is automatically selected from a group of images in a image based media browse window. In addition, when an image is selected in an image based media browse window, a media track associated therewith is automatically selected in a text based media browse window.

Another aspect of the invention relates to resetting browsed content to the currently playing media (go back to currently playing album after a delay).

These and other embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
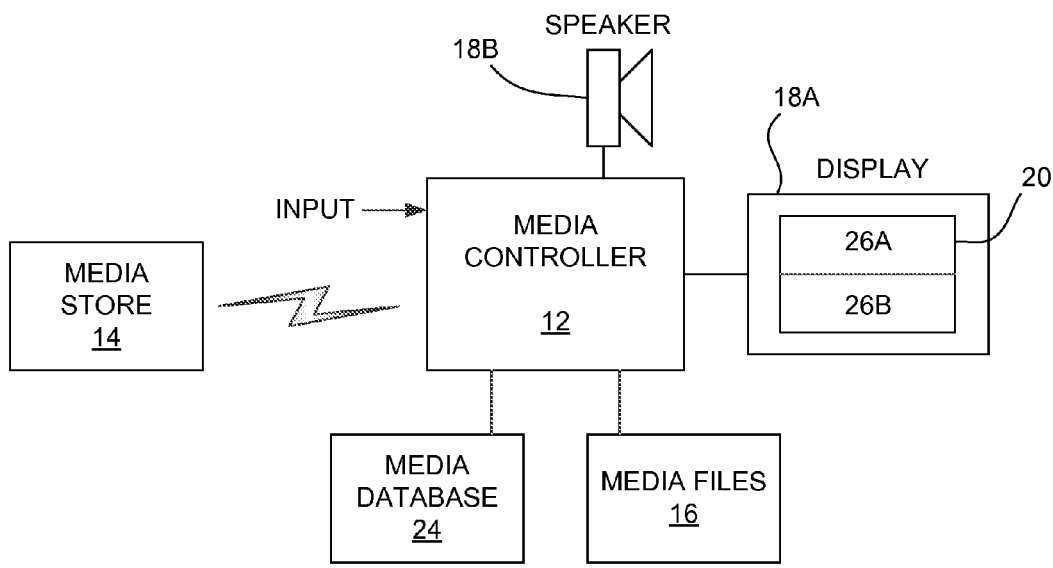
FIG. 1 is a simplified block diagram of an electronic device capable of storing, cataloging, selecting and outputting media, in accordance with one embodiment of the present invention.

FIG. 1 is a simplified block diagram of an electronic device 10 capable of storing, cataloging, selecting and outputting media, in accordance with one embodiment of the present invention. The electronic device 10 may for example be a personal computer, PDA, cellular phone, media player, etc.

The electronic device 10 includes a media controller 12 configured to manage media operations performed at the electronic device 10. The media controller 12 may receive inputs from various input devices. The input devices may for example include mice, touch pads, navigation pads, buttons, touch screens, and the like.

The media controller 12 may also interact with a remote media store 14 to obtain media. The media store 14 is a location where media can be purchased. The remote media store may for example be an online media store that sells media such as music and video over the Internet.

The media controller 12 may also be configured to play and control the output of media that is stored locally in a media file system 16 or stored remotely at the media store 14 through various output devices 18. The output devices 18 may for example include a display 18A and one or more speakers 18B. By way of example, image based media such as video may be outputted via the display 18A and audio based media such as music may be outputted via one or more speakers 18B.

The media controller 12 may additionally be configured to generate a graphical user interface 20 on the display 18A. The graphical user interface 20 provides an easy to use interface for controlling media operations performed at the electronic device. The graphical user interface 20 may be created using media content stored locally in a media database 24. The media database 24 generally includes media content that describes various aspects of particular media files stored at the media file system 16. The media content may for example include descriptors and images associated with particular media files. By way of example, in the case of songs, the media content may include song name, album name, artist name, time, genre, album art, and the like. The graphical user interface 20 may also be created using information found remotely as for example at the media store 14. For example, the media store may provide media content for use by the graphical user interface 20.

Generally speaking, the GUI 20 represents, applications, files and operational controls with graphical images. The graphical images may include windows, fields, dialog boxes, menus, icons, buttons, cursors, scroll bars, folders, lists, text, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular application. The GUI can additionally or alternatively display information, such as non interactive text and graphics.

In accordance with one embodiment, the graphical user interface 20 includes a browse window 26 for scrolling or traversing through media information (both local information and remote information). In some cases, the browse window 26 may include rows of media tracks associated with particular media files. Each media track includes various fields containing text based media data, which is associated with the media file, and which is typically pulled from the media database 24 or remote media store 14. The text based browse window allows a user to browse through large numbers of media tracks, and information associated with the media tracks. The browse window 26 may alternatively be configured to present images associated with particular media files. Like the text based media data, the images may also be pulled from the media database 24 or remote media store 14. The image based browse window allows a user to browse through images instead of rows of text based media tracks.

In accordance with one embodiment, the graphical user interface 20 includes multiple browse windows 26A and 26B. For example, the graphical user interface 20 may include a text based browse window 26A and an image based browse window 26B. By using multiple browse windows 26, the user can easily go back and forth depending on their needs. Basically, the user can choose how they want to browse on the fly.

In accordance with one embodiment, the multiple browse windows 26A and 26B are further integrated so as to provide a coherent visual representation of what is being browsed through. As should be appreciated, if browsers work independently they may become out of synch (not displaying information about same media file) and it may not be obvious to the user how to get them back together (they have separate browse controls such as scroll bars). Integration of the browse windows solves this problem. By being integrated, when selections are made in one browser, the other browser is configured to automatically synch with the other browser. In addition, when selection are made in the second browser, the other browser is configured to automatically synch with the second browser. That is, the content of the two browsers synch so they are both showing content related to the same media file. As such, the user does not get confused when going back and forth between browsers.

FIGS. 2A-2D are various diagrams of a browse windows 50A-D capable of browsing through images, in accordance with several embodiments of the present invention. The browse windows 50A-D may for example be used in the graphical user interface of FIG. 1. In each of these embodiments, the browse windows 50A-D provides a scrolling type action that permits a user to scroll or flip through images 56 in an efficient and user friendly manner. The images 56 typically describe graphically some aspect of one or more media files. In the case of a song file, the image 56 may be album art. In the case of an audio book file, the image 56 may be a book cover. In the case of a movie file, the image 56 may be poster art. In the case of a game file, the image 56 may be the cover jacket of the game. Once a desired image 56 is found, the user can select the desired image 56 in order to play a media file associated with the image 56. Alternatively, the images 56 can also be used to open a new window or launch an application.

As shown in the Figures, the browse windows 50A-D each include a viewing area 52 and browse controls 54. The viewing area 52 provides a location where images 56 (or icons) from a group of images are taken in and out of view. The viewing area 52 typically only displays a small portion of the total number of images 56 that are available in the group of images. In most cases, the images 56 move from one position to another along path or line that is spread across the viewing area 52. The path or line may be straight, angled, curved, stepped, waved, serpentine or the like. The number of positions along the line may be widely varied and is typically determined by the size of the viewing area 52, the desired size of the images 56, the length of the path or line and the desired number of images 56 to be viewed at any one time. In some cases, the images 56 may be moved through the viewing area 52 with a visual transition effect or animation. Sound effects such as clicks or flipping noises may also be used.

The browse controls 54, on the other hand, provide a location for initiating navigation commands. In one embodiment, the browse controls 54 include a horizontal scroll bar 58. In order to traverse through the images 56 the user simply moves the scroll tab left or right. The user may also click the left and right arrow buttons 60 for incremental single position movements (e.g., each click moves the images one position), or hold on the left and right arrow buttons for continuous multiple position movements or accelerated movements. The user may also select the area between the tab and the arrow buttons for a single large coarse movement. Alternatively or additionally, the browse controls 54 may include arrow buttons at the side of the images 56 that work similarly to the arrow buttons found on the scroll bar.

In most cases, the images 56 are presented in a primary position 62 and one or more secondary positions 64 that are next to the primary position 62. The primary position 62 is the location where the images 56 move when they are to be selected. That is, the images 56 can be selected when they are in the primary position 62. In essence, placing the images 56 in the primary position 62 is analogous to highlighting the image 56 (selected but not activated). The secondary positions 64 are holding positions, and the images 56 located thereon are locked from activation. Although limited by their number, the images 56 at the secondary positions 64 allow a user to view what images 56 that are before and after the primary image thereby making browsing easier (the user can visually scan which images are of interest and which are not). In some cases, the user may click on an image at a secondary position 64 in order to move it from the secondary position 64 to the primary position 62. In essence, selection of an image at a secondary position results in rapid traversal through the group of images until the selected image is finally moved into the primary position 62.

The layout and configurations of the images 56 may be widely varied. In one embodiment, the image 56 at the primary position 62 is made to stand out from the images 56 at the secondary positions 64. This may be accomplished by reformatting or configuring the secondary images differently from the primary image thereby alerting the user as to which image is primary and which images are secondary (by adjusting the size and/or shape of the images). Additionally or alternatively, this may be accomplished with a graphical highlight effect that shades, surrounds or underlines the image at the primary position. For example, the browser may include a highlight window that the image at the primary position 62 moves under when transitioning across the viewing area 52. Additionally or alternatively, this may also be accomplished by placing an identifier or descriptor underneath or over the image at the primary position 62. For example, the identifier may be the name or title associated with the media file the image represents. By way of example, in the case of a song file, the image may be album art and the identifier may include the artist and album name.

Figure 2A:
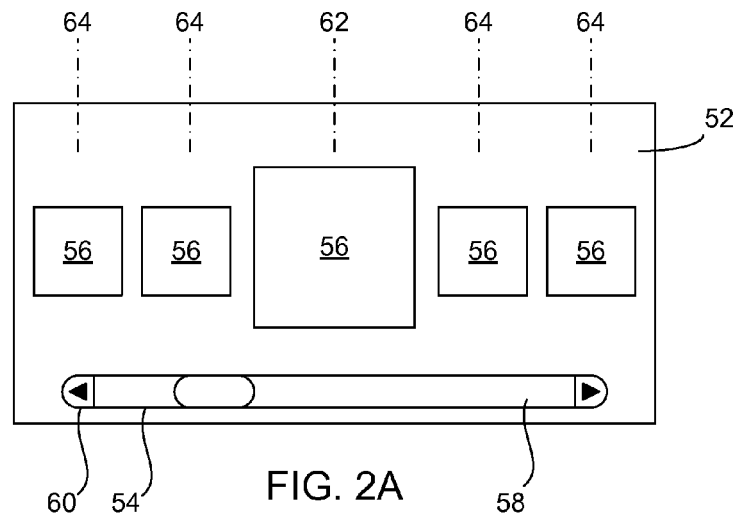
FIGS. 2A-2D are various diagrams of a browse windows capable of browsing through images, in accordance with several embodiments of the present invention.

FIGS. 2A-2D will now be described in detail. In FIG. 2A, the path or line is a straight line that runs horizontally across the viewing area 52. During traversal, the images 56 move horizontally as a group across the viewing area 56 from one position to another. When a user initiates a left navigation command, a new image 56 appears at the left position of the viewing area 52 and all other images 56 move over one position. If the viewing area is full, the right most image 56 moves out of the viewing area 52. Similarly, when a user initiates a right navigation command, a new image 56 appears at the right position of the viewing area 52 and all other images 56 move over one position. If the viewing area is full, the left most image 56 moves out of the viewing area 52. This allows a user to view consecutive images currently held outside of the viewing area 52. Furthermore, the images 56 in the secondary positions 64 are made smaller than the image 56 in the primary position 62. During browsing, when the images 56 are moved from primary position 62 to secondary position 64, the images 56 decrease in size and when the images 56 are moved from secondary position 64 to primary position 62, the images 56 increase in size.

Figure 2B:
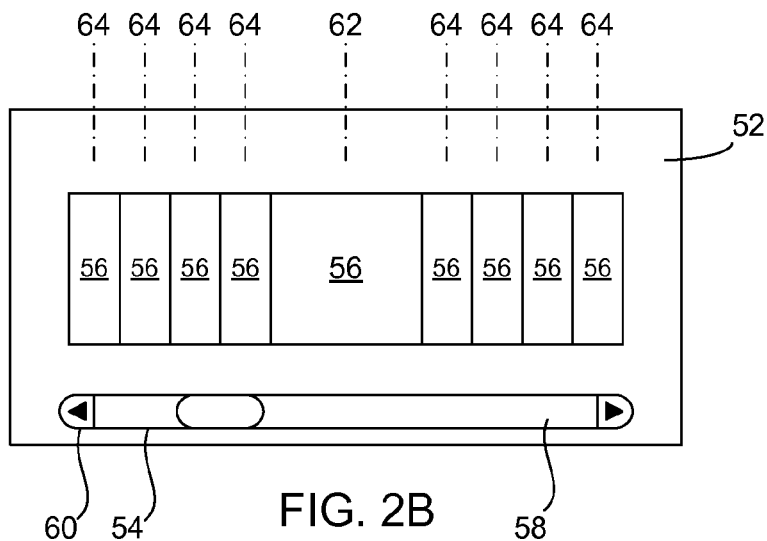

FIG. 2B is similar to FIG. 2A in that the images 56 move horizontally across the viewing area 52. However, unlike FIG. 2A, the images 56 at the secondary positions 64 are made to appear as if they are layered rather than being spatially separated as in FIG. 2A. This allows more images to be presented. In this implementation, each consecutive secondary image partially falls underneath the previous image thereby leaving an edge portion exposed 57. The exposed portion 57 may provide enough visual information for a user to identify the image. The exposed edge portion 57 may also include text based information. During browsing, when the images 56 are moved from the primary position 62 to subsequent secondary positions 64, the images 56 are reconfigured as a partially exposed edge portion 57 and when the images 56 are moved from secondary position 64 to the primary position 62, the images are reconfigured to be a full image view. The images may be reconfigured on the fly or they may be stored in a media database along with the full view images.

Figure 2C:
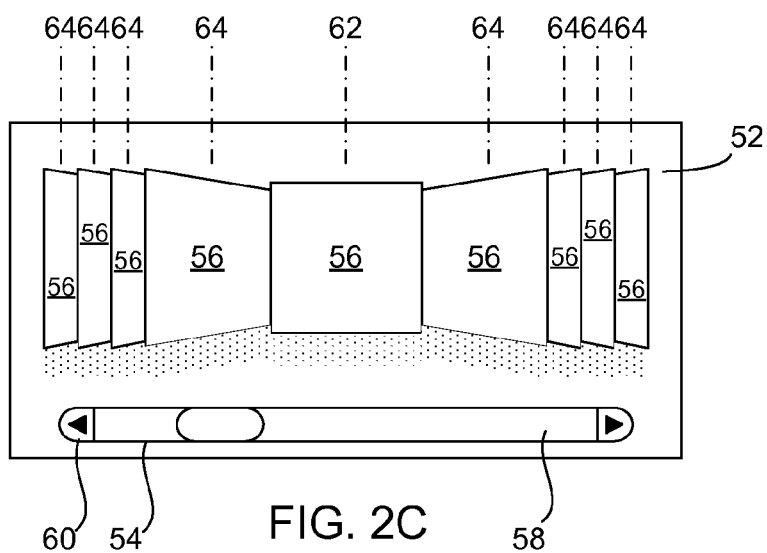

FIG. 2C is similar to FIG. 2B in that the images 56 move horizontally across the viewing area 52 and are layered so that more images 56 can be presented. However, unlike FIG. 2B, the secondary images immediately next to the primary image are in full view with each consecutive secondary image falling underneath the previous image being a partial view.

Furthermore, the images at the secondary positions 64 may be skewed in order to make it look like they are extending from the foreground into the background (3D effect). This effect may be created by lowering the top right corner and raising the bottom right corner of each image in a left secondary position and by lowering the top left corner and raising the bottom left corner of each image in a right secondary position. During browsing, when the images 56 are moved from primary position 62 to secondary position 64, the images 56 are skewed and when the images 56 are moved from secondary position 64 to primary position 62, the images 56 are normal.

Moreover, the images 56 may include a reflected portion 66 that extends downward from the base of the image 56. The reflected portion 66 may be created by making a copy of the image, cropping the copy of the image (e.g., shortening), vertically flipping the cropped image, altering the transparency of the flipped image from semi transparent at the top to fully transparent at the bottom (e.g., gradient), and attaching the top of the flipped image to the bottom of the image. Thereafter, the combination may be skewed as mentioned above. The images 56 may be laid over a black background to further aid the reflection effect.

Figure 2D:
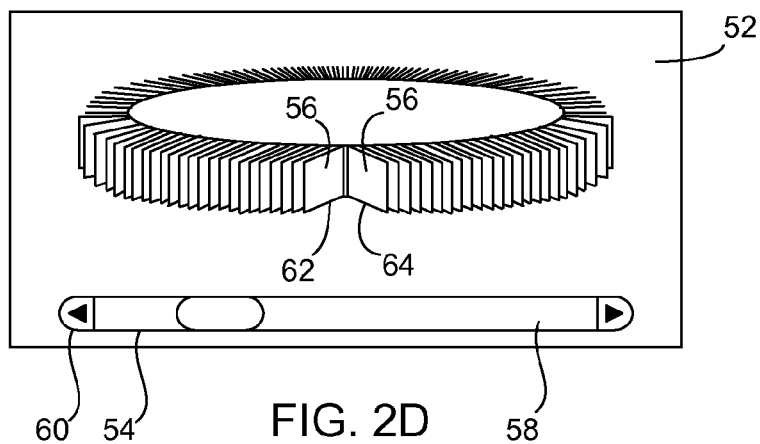

Similar to FIG. 2C, FIG. 2D includes layered and skewed images. However, unlike the previous embodiments, FIG. 2D includes an oval path around which the images 56 are rotated. As such, all the images 56 can be found in the viewing area 52. This embodiment is somewhat analogous of a rolodex where pages flip around a pivot axis (e.g., virtual rolodex). Also in this embodiment there are two full size central images, one of which is the primary image and one that is a secondary image.

Furthermore, the images 56 are configured to appear as though they are on a visual plane with the two central images appearing in the foreground, and the remaining images at the secondary positions drifting into the background (looks like they are behind and transitioning to a vanishing point from the images in the front positions). This effect may be achieved by reducing the size of the images 56 when they are in the secondary positions and further making the images 56 become smaller and smaller the further the images are from the two front positions.

When following these rules, a worms eye view (the visual angle of the viewer being low) will be created when the primary position is at the highest point on the path, and a birds eye view (the visual angle of the viewer being raised) will be created when the primary position is at the lowest point on the path (as shown). The depth of view in either the worms eye view or birds eye view can be adjusted by altering the height of the oval path. A larger depth of view will be created with an oval path having a larger height, and a smaller depth of view will be created with an oval path having a short height.

During operation, the images 56 are configured to move along the line from one preset position to the next preset position. For example, when a navigation command is received, the media icons are all moved over one position. That is, they move as a group along the line and stop when they all have shifted to the next preset position. If the navigation command is a left command, the media icons typically rotate around the line in a counter clockwise motion. If the navigation command is a right command, the media icons typically rotate around the line in a clockwise motion.

Figure 3:
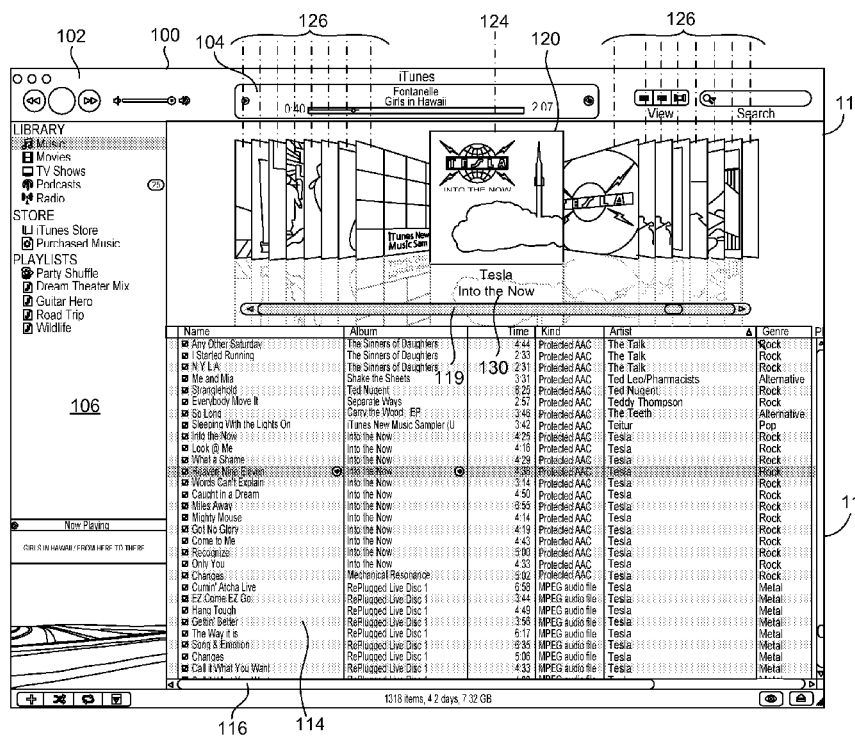
FIG. 3 is a screen shot of a media application window, in accordance with one embodiment of the present invention.

FIG. 3 is a screen shot of a media application window 100, in accordance with one embodiment of the present invention. The application window 100 is configured to allow users to play, sort, modify, store and catalog their media. By way of example, the application window 100 gives the user the ability to control playback, search through content, organize media into folders (e.g., playlists), edit file information, record media, transfer media, purchase media as for example over the Internet, provide feedback relating to media being played, encode or transcode media into different formats, and the like.

As shown, the border of the application window 100 includes media playback controls 102 such as soft buttons and sliders. The media playback controls 102 typically depend on the media being played and therefore can be widely varied. In the case of music, for example, the border may include a volume slider bar and soft buttons for previous, play/pause, and next. The border of the application window 100 may also include a feedback window 104 that provides information about the media being played. For example, in case of music, the feedback window may include artist, song name and duration of play. The application window 100 also includes a menu window 106, which includes such things as library file folders, store file folders and play list file folders. The menu window 106 may also include a link for connecting to an online music store.

In accordance with one embodiment, the application window 100 also includes a pair of linked browser windows 110 and 112, each of which provides a different way of browsing through media content. Because they are linked, the media content provided in each is related and often parallel. As such, the application window 100 appears not to be disjointed and the user experience is enhanced.

In one embodiment, the browser windows 110 and 112 are linked in such a manner that selections in one effect the other. For example, the content displayed in the first browser window 110 is automatically synched with the content that has been selected in the second browser window 112, and the content displayed in the second browser window 112 is automatically synched with the content that has been selected in the first browser window 110.

As shown, the first window 110 is configured for displaying the contents of a particular file folder when the particular file folder is selected or opened. The contents may be displayed as media tracks 114 that are placed in vertical list format. Each media track 114 is tied or linked to a particular media file. For example, each media track 114 may represent a particular song or video file. Each media track 114 may include a plurality of sortable fields containing text based data about the media file the media track represents. The text based data may be contained and pulled from a media database. In order to sort, a particular title field is selected and the order of the media tracks 114 are reconfigured based on the sort field selected. In order to open or play the media file associated with the media track 114, the media track 114 is highlighted and selected.

The first window 110 may also be configured with a horizontal scroll bar 116 so that all the fields can be viewed and a vertical scroll bar 118 for traversing through the rows of media tracks. For example, in order to traverse through the rows of media tracks 114 the user simply moves the scroll tab up or down. The user may also click the top and bottom arrow buttons of the scroll bar for incremental single position movements (e.g., each click moves the tracks one position), or hold on the left and right arrow buttons of the scroll for continuous multiple position movements or accelerated movements. The user may also select the area between the tab and the arrow buttons for a single large coarse movement.

The media files may for example correspond to songs, movies, TV shows, podcasts, radio stations, games, etc. Furthermore, the text based media data may be metadata that describes some aspect of a particular media file. In the case of a song file, the metadata may be selected from song name, time, artist, album, genre, rating, play count, last played, etc. Similarly, for a movie file, the metadata may be selected from movie title, duration, actors, director, producer, rating, type, etc.

The second window 112, on the other hand, provides a location where a user can browse through a group of images 120, each of which are linked to one or more media files. Similarly to the text based media content of the first window 110, the images 120 may be assigned to particular media files. The images 120 typically describe some aspect of one or more media files. In the case of a song file, the image 120 may be album art. In the case of an audio book file, the image 120 may be a book cover. In the case of a movie file, the image 120 may be poster art. In the case of a game file, the image 120 may be the cover jacket of the game.

In one embodiment, the group of images 120 are based on the media tracks 114 found in the first browse window. That is, only the images 120 associated with the media tracks 114 in the opened file folder of the first browser window 110 are presented in the second browse window 112. They may be ordered similarly to the first browser window 110 or they may follow a fixed sort criteria such as alphabetically, category, rating, type, and/or the like. In another embodiment, none of the images 120 in the group of images are redundant. For example, if multiple tracks have the same image, only a single image is included in the group of images. It should be appreciated that these are not limitations. For example, redundant images may be provided in the group of images if so desired. In cases such as these, the browser 112 may try to prevent redundant images from being placed side by side in the group of images 120.

In the second window 112, a plurality of images (or icons) 120 from a group of images are displayed and allowed to move horizontally across a viewing area 122. The viewing area 122 typically only displays a small portion of the total number of images 120 that are available in the group of images. In most cases, once the viewing area 122 is full, each new image 120 appears at the edge of the viewing area 122 and all other images 120 move over one position. That is, a new image 120 appears for each image 120 that moves out of the viewing area 122. This allows a user to view consecutive images 120 currently held outside of the viewing area 122. Once a desired image is found, the user can select the desired image 120 in order to play a media file associated with the image 120.

In the illustrated embodiment, the images 120 are presented in a central primary position 124 and one or more secondary positions 126 to the left and right of the central primary position 124. As mentioned previously, the primary position 124 is the location where the images 120 move when they are to be selected. The secondary positions 126, on the other hand, are holding positions that allow a user to view what images 120 that are before and after the primary image thereby making browsing easier (the user can visually scan which images are of interest and which are not). In the illustrated embodiment, there are eight secondary positions 126 to the left and right of the central primary position 124.

The second window 112 may also be configured with a horizontal scroll bar 119 for traversing through the images 120. For example, in order to traverse through the images 120 the user simply moves the scroll tab left or right. The user may also click the left and right arrow buttons of the scroll bar 119 for incremental single position movements (e.g., each click moves the tracks one position), or hold on the left and right arrow buttons of the scroll bar 119 for continuous multiple position movements or accelerated movements. The user may also select the area between the tab and the arrow buttons of the scroll bar 119 for a single large coarse movement. In some cases, the user may click on an image 120 at a secondary positions 126 in order to move it from the secondary position 126 to the primary position 124. In essence, selection of an image 120 at a secondary position 126 results in rapid traversal through the group of images until the selected image 120 is finally moved into the primary position 124.

When a user initiates a left navigation command, a new image 120 appears at the left position of the viewing area 122 and all other images move over one position. If the viewing area 122 is full, the right most image 120 moves out of the viewing area 122. Similarly, when a user initiates a right navigation command, a new image 120 appears at the right position of the viewing area 122 and all other images 120 move over one position. If the viewing area 122 is full, the left most image 120 moves out of the viewing area 122.

The number of positions that the images 120 move typically depend on the navigation command. When a single position navigation command is received, the images 120 are all moved over one position. That is, they move linearly as a group and stop when they all have shifted to the next position. For example, if a right navigation command is received, the left most image 120 is removed from the viewing area 122, the remaining images 120 move one position to the left and a new image 120 is introduced in the right most position (or vice versa for a left navigation command). When a multiple position navigation command is received, the images 120 are all moved over the number of positions indicated by the multiple position navigation command. That is, they move as a group and stop when they all have shifted the appropriate number of positions. This type of navigation is beneficial when the user desires to accelerate through the images 120. In some cases a visual transition effect or animation is provided to visual represent accelerated scrolling.

In one embodiment, a text based identifier 130 of the image 120 is disposed underneath or over the image 120 located at the primary position 124. For example, the name or title associated with the media file(s) the image 120 represents. By way of example, in the case of a song file, the image may be album art and the identifier may include the artist and album information.

Alternatively or additionally, the images 120 in the secondary positions 126 may be made smaller than the image in the primary position 124. During browsing, when the images 120 are moved from primary position 124 to secondary position 126, the images 120 decrease in size and when the images 120 are moved from secondary position 126 to primary position 124, the images 120 increase in size.

Alternatively or additionally, the images 120 at the secondary positions 126 are made to appear as if they are layered over one another. In this implementation, the secondary images 126 immediately next to the primary image 124 are typically in full view with each consecutive secondary image falling underneath the previous image. The images 120 disposed underneath the full view image typically have a portion exposed. The exposed portion may provide enough visual information for a user to identify the image. The exposed portion may also include an edge with text based information (similar to the edge of a record or CD case). During browsing, when the images 120 are moved from the first secondary position 126 to subsequent secondary positions 126, the images are reconfigured as a partially exposed edge and when the images 120 are moved from secondary position 126 to the first secondary position 126, the images 120 are reconfigured to be a full image view.

Additionally or alternatively, the secondary images 126 may be skewed in order to make it look like they are extending from the foreground into the background. This effect may be created by lowering the top right corner and raising the bottom right corner of each image in a left secondary position and by lowering the top left corner and raising the bottom left corner of each image in a right secondary position. During browsing, when the images 120 are moved from primary position 124 to secondary position 126, the images are skewed and when the images 120 are moved from secondary position 126 to primary position 124, the images are normalized.

Additionally or alternatively, the images 120 may include a reflected portion 140 that extends downward from the base of the image. The reflected portion may be created by making a copy of the image, cropping the copy of the image (e.g., shortening), vertically flipping the cropped image, altering the transparency of the flipped image from semi transparent at the top to fully transparent at the bottom (e.g., gradient), and attaching the top of the flipped image to the bottom of the image. Thereafter, the combination may be skewed as mentioned above. The images may be laid over a black background to further aid the reflection effect.

Figure 4:
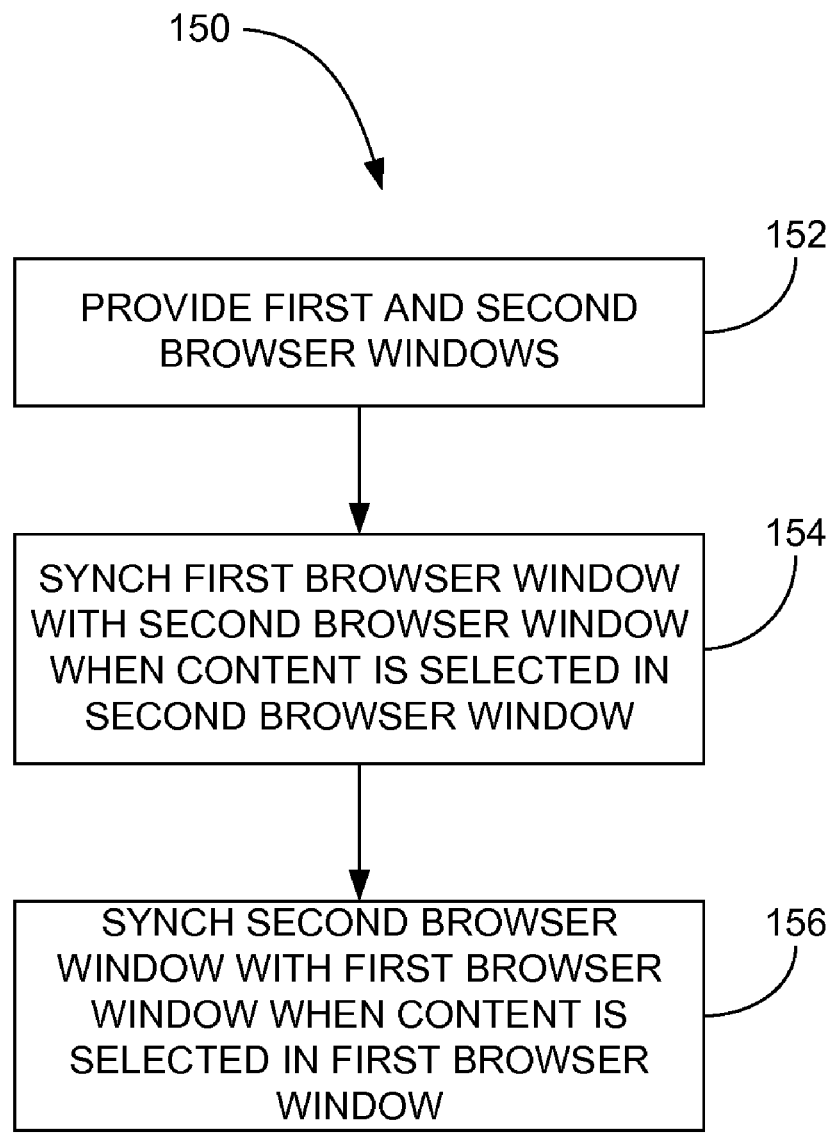
FIG. 4 is a method of operating multiple browser windows, in accordance with one embodiment of the present invention.

FIG. 4 is a method 150 of operating multiple browser windows, in accordance with one embodiment of the present invention. The method 150 starts by providing first and second browser windows in block 152. Each browser window typically provides a different way of browsing through content. The browser windows may for example be the text based browser window and the image based browser window shown in FIG. 3.

The method 150 further includes block 154 where the first browser window is synched with the second browser window when content is selected in the second browser window. For example, the first browser window adjusts its content to show a selection made in the second browser window. In the context of the browsers of FIG. 3, if a user initiates playback of a media file by selecting a media track in the first browser window, then the images in the second browser window are adjusted to bring forth and possibly highlight the image associated with the media track. This may for example be accomplished by automatically scrolling or flipping through the images until the appropriate image is brought into the viewing area and making the image more prominent than the other displayed images.

The method 150 further includes block 156 where the second browser window is synched with the first browser window when content is selected in the first browser window. For example, the second browser window adjusts its content to show a selection made in the first browser window. In the context of the browsers of FIG. 3, if a user selects an image in the second browser window, then the first browser window is adjusted to bring forth one or more media tracks associated with the image. This may for example be accomplished by automatically scrolling through the rows until the appropriate media track(s) is brought into the viewing area. Since more than one media track may be tied to the image, block 156 may further include determining the order of the media tracks assigned to the image, bringing forth at least the first media track from the group of media tracks and highlighting the first media track. The determination may for example be based on the sort criteria in the first browser window. Moreover, selecting an image may also initiate automatic playback of the first media track.

Figure 5:
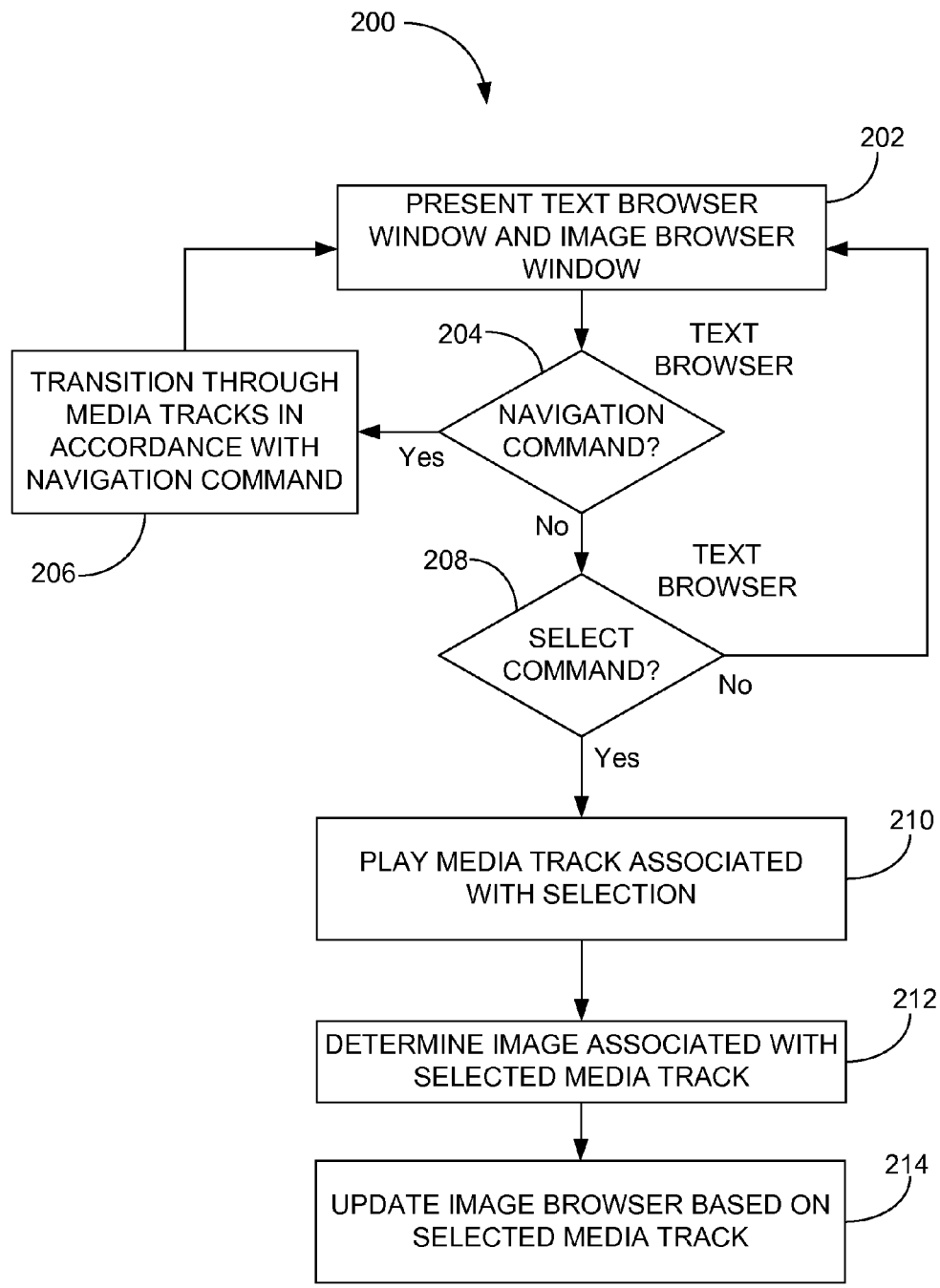
FIG. 5 is a method of operating integrated browser windows, in accordance with one embodiment of the present invention.

FIG. 5 is a method 200 of operating integrated browser windows, in accordance with one embodiment of the present invention. The method begins at block 202 where an image based browser window and a text based browser window are presented. See for example FIG. 3. In block 204, a determination is made as to whether or not a navigation command has been made at the text based browser window. For example, whether or not a user has moved the tab of the scroll bar up or down. If yes, then the method 200 proceeds to block 206 where the rows of media tracks are moved across the viewing area in accordance with the navigation command. If no, then the method proceeds to block 208 where a determination is made as to whether or not a select command has been made at the text based browser window. For example, whether or not a user has clicked on a particular media track. If no, then the method 200 proceeds back to block 202. If yes, then the method 200 proceeds to blocks 210-214.

In block 210, the media file associated with the selection is played, opened, or launched. In block 212, the image associated with the selected media track is determined. For example, a media database may be consulted or the media track may include a pointer to a particular image. In block 214, the image based browser window is updated based on the selection. Block 214 may for example include transitioning through the images until the image associated with the selected media track is brought into view in the viewing area and made to be more recognizable than the other images in the viewing area (e.g., larger size, primary position, highlight, etc.).

The transition may be instantaneous, or alternatively the transition may move the group of images through each of the positions until the desired image is found. Because the group of images can be rather lengthy, the image based browser window may rapidly traverse or skip through all or some of the images when performing its transition. In some cases, the transition speed or the number of images skipped may depend on the number of images found between previous and new image. Furthermore, animation techniques may be used to further aid in the transition of images.

Figure 6:
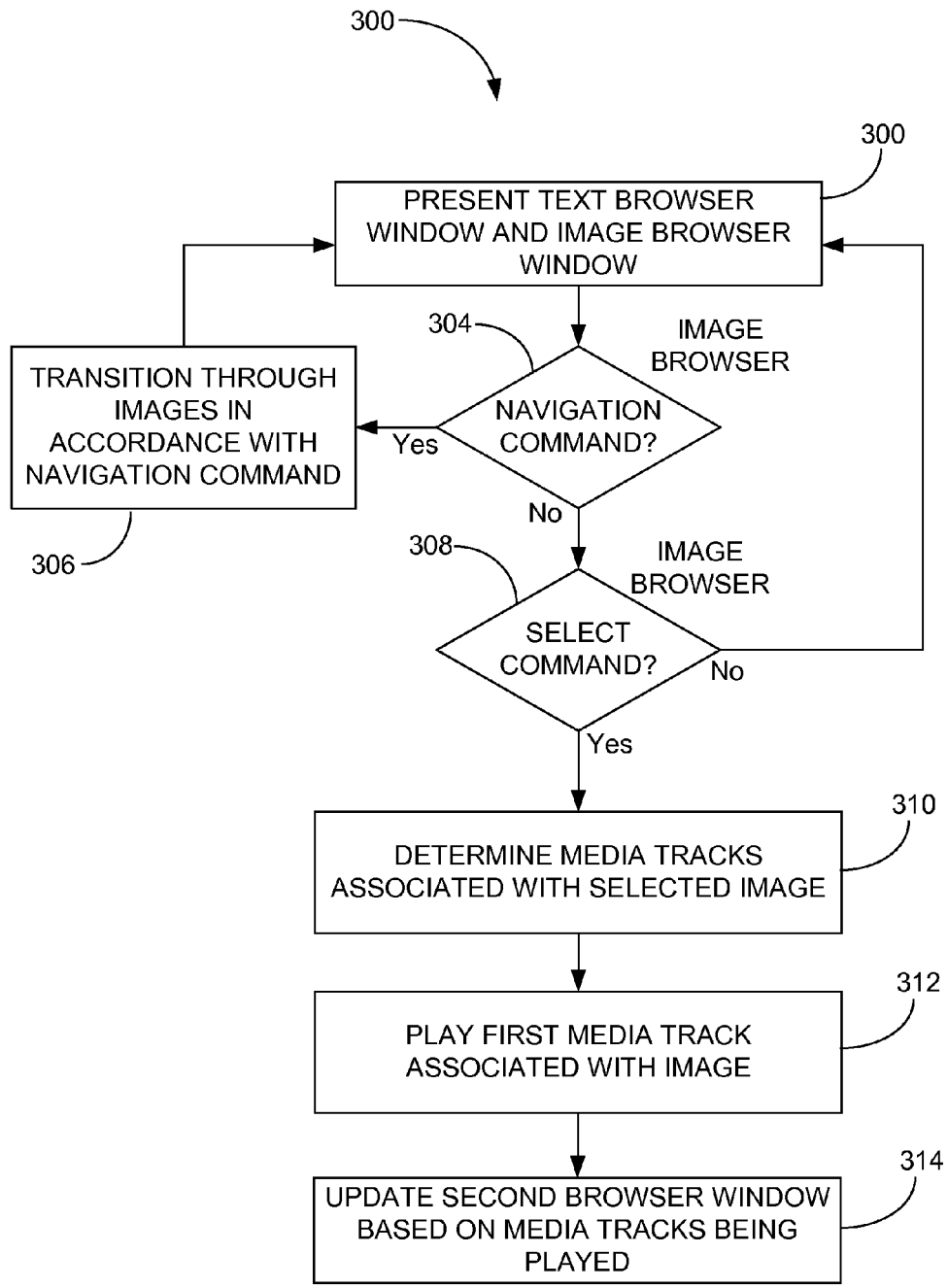
FIG. 6 is a method of operating integrated browser windows, in accordance with one embodiment of the present invention.

FIG. 6 is a method 300 of operating integrated browser windows, in accordance with one embodiment of the present invention. The method 300 generally begins at block 302 where an image based browser window and a text based browser window are presented. See for example FIG. 1.

In block 304, a determination is made as to whether or not a navigation command has been made at the image based browser window. For example, whether or not a user has moved the tab of the scroll bar right or left. If yes, then the method 300 proceeds to block 306 where images are moved across the viewing area in accordance with the navigation command. For example, the images are transitioned through the viewing area. If no, then the method 300 proceeds to block 308 where a determination is made as to whether or not a select command has been made at the image based browser window. For example, whether or not a user has clicked on a selectable image (e.g., image at primary position). If no, then the method 300 proceeds back to block 302. If yes, then the method 300 proceeds to block 310 where the media tracks and the order of media tracks associated with the image are determined. The order may be based on the sort criteria found in the text based browse window. That is, the fields and sort criteria of the text based browser window may be consulted to determine the order of media tracks. By way of example, if artist name is one of the sort criteria then the media tracks are ordered by artist name. IN one implementation, the order is determined by polling the sorted rows of media tracks, tagging which media tracks have links to the image and retaining the tagged media tracks in the order in which they were tagged.

Following block 310, the method 300 proceeds to blocks 312 and 314. In block 312, the media file associated with the first track from the ordered group of tracks is played, opened, or launched. In block 314, the text based browser window is updated based on the selection. Block 314 may for example include transitioning through the rows of media tracks until the media track associated with the first media track is brought into view in the viewing area and then highlighting the first media track.

The transition may be instantaneous, or alternatively the transition may move the media tracks through all the rows until the desired media track is found. Because the group of images can be rather lengthy, the text based browser window may rapidly traverse or skip through all or some of the media tracks when performing its transition. In some cases, the transition speed or the number of media tracks skipped may depend on the number of media tracks found between previous and new media track.

Figure 7:
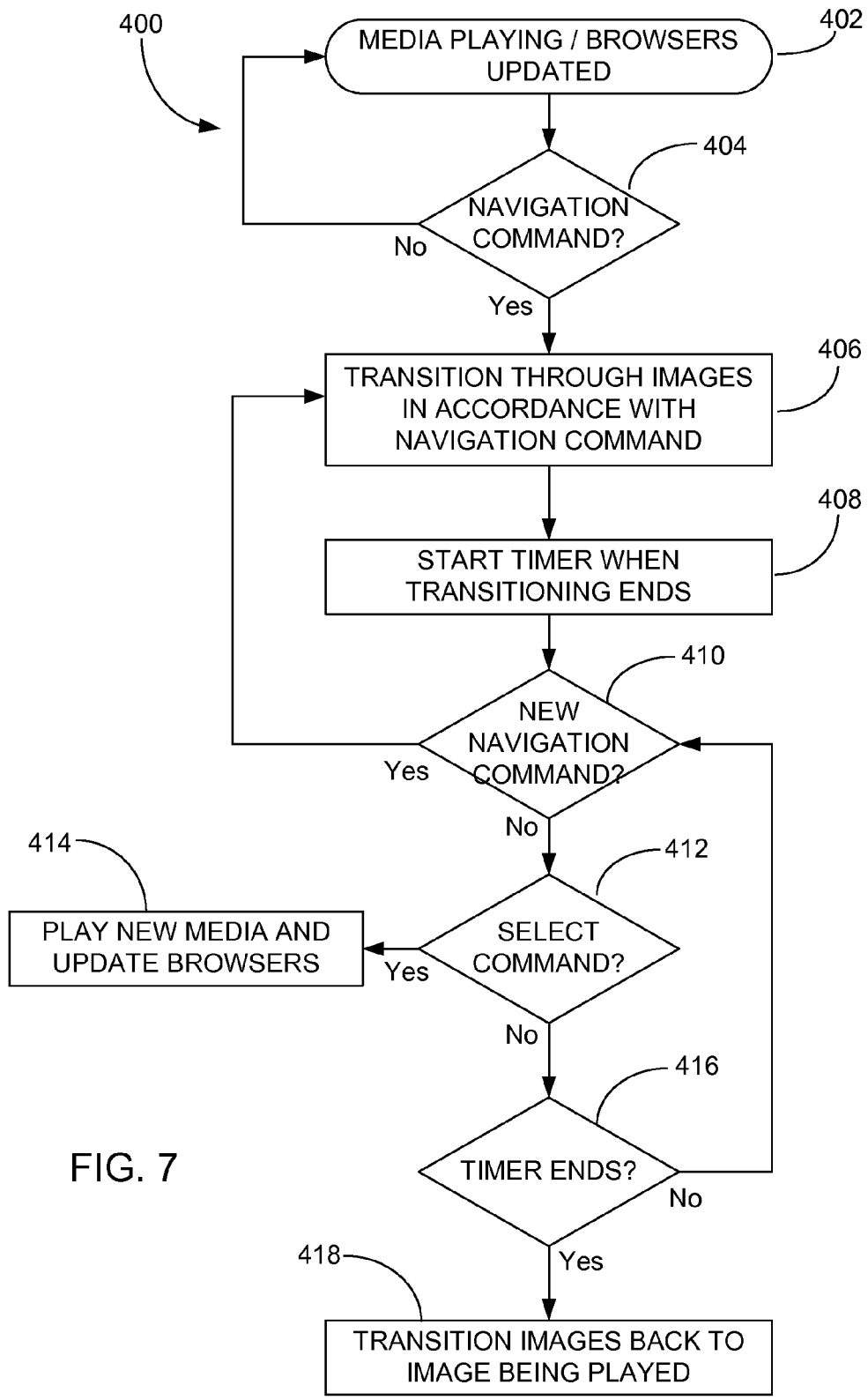
FIG. 7 is a method of operating integrated browser windows, in accordance with one embodiment of the present invention.

FIG. 7 is a method 400 of operating integrated browser windows, in accordance with one embodiment of the present invention. The method 400 begins at block 402 where media is playing and the browsers have been updated. This may for example occur after the methods 200 and 300 of FIGS. 5 and 6.

Following block 402, the method 400 proceeds to block 404 where a determination is made as to whether or not a navigation command is made at the image based browser window. For example, whether or not a user has moved the tab of the scroll bar right or left. If not, the method 400 proceeds back to 402. If so, then the method 400 proceeds to block 406 where images are moved across the viewing area in accordance with the navigation command.

When the image based browser window stops transitioning through the images (navigation complete), the method 400 includes starting a timer at block 408. Thereafter, in block 410 a decision is made as to whether a new navigation command is made at the image based browser window. If yes, then the timer is closed and the method 400 proceeds back to block 406. If no, then a decision is made as to whether or not a select command has been made at the image based browser window at block 412. If so, then the method 400 proceeds to block 414 where the timer is closed and new media is played and the browsers are updated based on the selection. If not, then the method 400 proceeds to block 416 where a determination is made as to whether or not the timer has ended. The timer may for example be between 5-30 seconds, and more particularly 15 seconds. In some cases, the amount of time associated with the timer is programmable and user selectable. If the timer has not ended, the method proceeds back to block 410. If the timer has ended, then the method 400 proceeds to block 418 where the images in the image based browser window are transitioned back to the image associated with the media being currently played (e.g., image at block 402).

The various aspects, features, embodiments or implementations of the invention described above can be used alone or in various combinations. For example, the methods described in FIGS. 5-7 may all be used together.

U.S. Patent Publication No. 2004/0268451 A1 is hereby incorporated by reference herein. U.S. Patent Publication No. 2005/0021478 A1 is hereby incorporated by reference herein.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention.

For example, it should noted that the imaged based browser windows described herein are not limited to browsing through local content. The image based browser windows may also be used to browse through content stored at a remote location as for example at a server. The server may for example be a media commerce server that enables media items to be purchased over a network. In this embodiment, images relating to media items available for purchase are obtained from the remote server that stores the images and media items. Thereafter, the browse window displays the images of media items available for purchase at the client as for example using any of the image based browser windows described herein. If need be, the images can be reconfigured locally to support the graphical representation of the browser (e.g., size, skew, reflect, etc.). Alternatively, the server may supply all the necessary images for graphically supporting the browser (e.g., through various thumbnails).

Upon selecting an image, media items associated with image can be made available. The media items can be obtained initially with the images or they may be obtained following the selection. For example, a request for media items associated with the selected image may be sent, and if a response is received back the media items can be displayed for purchase. Furthermore, if a navigation command is made, the images are moved according to the navigation command. All the images necessary for navigation can be supplied initially or alternatively the images can be supplied as needed by the remote server following the navigation command. In one embodiment, to increase performance, low resolution versions of the images are used when the images are being moved, and high resolution images are used when the images are stopped.

It should also be noted that there are many alternative ways of implementing the methods and apparatuses of the present invention.

It is therefore intended that the following appended claims be interpreted as including all such alterations, permutations, and equivalents as fall within the true spirit and scope of the present invention.

What is claimed is:

1. A graphical user interface providing image-based browsing of data with respect to a display screen associated with a computing device, said graphical user interface comprising:

an image browser window generated by an application program operating on the computing device, the image browser window concurrently including a first browsing region and a second browsing region, the first browsing region displaying descriptive information regarding one or more digital assets, and the second browsing region displaying a plurality images associated with the one or more digital assets, wherein the second browsing region displays the plurality of images on the display device, each of the images pertaining to an associated digital asset, the second browsing region including at least:
- a primary image position displaying one of the plurality of images selected as a primary image; and
- a plurality of secondary image positions, each of said secondary image positions displaying a different one of the plurality of images other than the primary image, and wherein the data shown in the first and second browsing regions is automatically synched when selections are made in the first and second browsing regions.

2. A graphical user interface as recited in claim 1, wherein the primary image displayed in said primary image position is larger than each of the images displayed in said secondary image positions.

3. A graphical user interface as recited in claim 1,
wherein the primary image displayed in said primary image position is not obscured by the images in said secondary image positions, and
wherein at least a plurality of the images displayed in said secondary image positions are obscured by other of the images displayed in said secondary image positions.

4. A graphical user interface as recited in claim 1, wherein the images displayed in said secondary image positions are skewed.

5. A graphical user interface as recited in claim 4, wherein the skewed images in said secondary image positions are skewed such that they are displayed to appear to extend from foreground into the background.

6. A graphical user interface as recited in claim 4, wherein the skewed images in said secondary image positions are skewed such that a top right corner is lowered and a bottom right corner is raised for each image in a left secondary position, and a top left corner is lowered and a bottom left corner is raised for each image in a right secondary position.

7. A graphical user interface as recited in claim 1, wherein said graphical user interface further comprises:
a horizontal scroll bar configured to receive user input to traverse through the images.

8. A graphical user interface as recited in claim 1, wherein the digital assets are digital media files.

9. A graphical user interface as recited in claim 1, wherein said graphical user interface further comprises:
at least one arrow button configured to receive user input to incrementally traverse through the images.

10. A graphical user interface as recited in claim 1, wherein in response to a user input, the images are sequentially moved left or right within said image browse window until a particular desired image from one of said secondary image positions arrives at said primary image position.

11. A graphical user interface as recited in claim 1, wherein the descriptive information displayed in the first browsing region comprises a list having a plurality of entries, with each entry displaying aspects pertaining to one of the images.

12. A graphical user interface as recited in claim 11, wherein the images pertain to media items, and wherein each of the entries of the list displays metadata pertaining to the corresponding media items.

13. A graphical user interface as recited in claim 12, wherein the list has a vertical list format.

14. A graphical user interface as recited in claim 12, wherein, selection of one of the entries of the list, causes the image associated with the selected entry to be transitioned to said primary image position.

15. A method for browsing data items with respect to a display screen associated with a computing device, said method comprising:

providing first and second browsing regions on the display screen, each of the browsing regions providing a different way of browsing through the data items;

displaying, within the first browsing region, a plurality of images on the display screen in a horizontal arrangement, each of the images pertaining to an associated data item, where the horizontal arrangement includes at least one of the images displayed in a primary image position and other of the images displayed in secondary image positions;

receiving a user input identifying a particular image from the images displayed in the secondary image positions;

moving, in response to the user input, the image at the primary image position to one of the secondary image positions while also moving the particular image from the secondary image position to the primary image position;

displaying, within the second browsing region, information about the data items corresponding to the plurality of images concurrently with said displaying of the plurality of images on the display screen in the horizontal arrangement;

synchronizing the first browsing region with the second browsing region when one of the data items is selected in the second browsing region; and synchronizing the second browsing region with the first browsing region when one of the images is selected in the first browsing region.

16. A method as recited in claim 15,
wherein the data items are digital media tracks,
if a navigation command has been made at the first browsing region, said synchronizing the first browsing region comprises moving the rows of media tracks across a viewing area in accordance with the navigation command, and
if a select command has been made for a selected media track at the first browsing region, said synchronizing the second browsing region comprises playing the selected media track, determining the image associated with the selected media track, and updating the images of the second browsing region based on the selected media track.

17. A method as recited in claim 15,
wherein the data items are digital media tracks,
if a navigation command has been made at the second browsing region, said synchronizing the second browsing region comprises moving the images across a viewing area in accordance with the navigation command, and
if a select command has been made for a selected image at the second browsing region, said synchronizing the first browsing region comprises determining the media tracks and the order of media tracks associated with the selected image, playing the first media track from the ordered group of media tracks, and updating the first browsing region browser window based on the selection.

18. A method as recited in claim 15,
wherein the data items are digital media tracks, and
wherein said method further comprises:
playing a media track; and
providing updated first and second browsing regions, the first browsing region containing a list of media tracks, the second browsing region containing a plurality of images that are associated with one or more media tracks of the first browsing region;

if a navigation command is made at the second browsing region, said synchronizing of the second browsing region comprises:

transitioning images across a viewing area in accordance with the navigation command;

starting a timer each time the second browsing region stops transitioning through the images;

during the timer, if a select command has been made at the second browsing region closing the timer, playing a new media track associated with the selection, and updating the first and second browsing regions based on the selection; and if the timer has ended, transitioning the images in the second browsing region window back to the image associated with the media track being currently played.

19. A method as recited in claim 15, wherein selection of one of the images being displayed in the horizontal arrangement causes the information corresponding to the selected image to be distinctively displayed.

20. A method as recited in claim 19, wherein selection of one of the data items being displayed in the second browsing region, causes the image being displayed in one of the secondary image positions of the horizontal arrangement that corresponds to the selected one of the data items to be transitioned to the primary image position.

21. A method as recited in claim 15, wherein selection of one of the images being displayed in the horizontal arrangement causes the information about the data item corresponding to the selected image to be distinctively displayed in the second browsing region, and wherein selection of a certain one of the data items being displayed in the second browsing region causes the image being displayed in one of the secondary image positions of the horizontal arrangement that corresponds to the certain one of the data items to be transitioned to the primary image position.

22. A method as recited in claim 15, wherein said synchronizing the first browsing region comprises sequentially moving images into and out of the primary image position until the particular image from the secondary image position arrives at the primary image position.

23. A method as recited in claim 15, wherein said synchronizing the first browsing region comprises sequentially and concurrently moving images into and out of the primary image position using a flipping visual effect until the particular image from the secondary image position arrives at the primary image position.

24. A method as recited in claim 15, wherein the image in the primary image position is larger than each of the images displayed in the secondary image positions.

25. A method as recited in claim 15, wherein said displaying of the information about the data items corresponding to the plurality of images comprises displaying a table having a plurality of rows, with each row displaying aspects pertaining to one of the data items.

26. A method as recited in claim 15, wherein said displaying of the information about the data items corresponding to the plurality of images comprises displaying a list having a plurality of entries, with each entry displaying aspects pertaining to one of the images.

27. A method as recited in claim 26, wherein the images pertain to media items, and wherein each of the entries of the list displays metadata pertaining to the corresponding media items.

28. A method as recited in claim 26, wherein the list has a vertical list format.

29. A method as recited in claim 26, wherein, selection of one of the entries of the list, causes the image associated with the selected entry to become the primary image.

30. A method as recited in claim 26, wherein, when the image at the primary image position changes, the order of the entries in the list being displayed changes such that the entry associated with the image in the primary image position is displayed as the first entry in the list.

31. A method as recited in claim 26, wherein, when the image at the primary image position changes, the entry in the list associated with the image in the primary image position is distinctively displayed.

32. A method as recited in claim 15, wherein said displaying of the plurality of images on the display screen comprises modifying the images for display in the secondary image positions to include a reflected portion.

33. A method as recited in claim 15, wherein said displaying of the plurality of images comprises skewing the images being displayed in the secondary image positions.

34. A method as recited in claim 33, wherein said skewing comprises:

for one or more of the images at the secondary image positions displayed to the left of the primary image, lowering the top right corner of the image and raising the bottom right corner of the image; and for one or more of the images at the secondary image positions displayed to the right of the primary image, lowering the top left corner of the image and raising the bottom left corner of the image.

35. A method as recited in claim 33, wherein the images being displayed at the secondary image positions are overlapped such that only a portion of at least a plurality of the images being displayed at the secondary image positions are exposed.

36. A method as recited in claim 33, wherein the images being displayed at the secondary image positions are skewed so as to have the appearance of extending from foreground to background.

37. A method as recited in claim 15, wherein for the images being displayed to the right of the primary image, the height on a left side of the images is reduced as compared to the height on a right side of the corresponding images.

38. A method as recited in claim 37, wherein for the images being displayed to the left of the primary image, the height on a right side of the images is reduced as compared to the height on a left side of the corresponding images.

39. A method for browsing data items with respect to a display screen associated with a computing device, said method comprising:

displaying a plurality of images on the display screen in a horizontal arrangement, each of the images pertaining to an associated data item, where the horizontal arrangement includes at least one of the images displayed in a primary image position and other of the images displayed in secondary image positions;

receiving a user input identifying a particular image from the images displayed in the secondary image positions;

moving, in response to the user input, the image at the primary image position to one of the secondary image positions while also moving the particular image from the secondary image position to the primary image position; and displaying information about the plurality of images concurrently with said displaying of the plurality of images on the display screen in the horizontal arrangement, the information being displayed including a list having a plurality of entries, with each entry displaying aspects pertaining to one of the images, wherein, user selection of one of the entries of the list, causes said moving to cause the image associated with the selected entry to become the primary image, and wherein, when the image at the primary image position changes in response to the user input, the entries in the list being displayed change such that at least one entry in the list associated with the image in the primary image position is distinctively displayed from other entries in the list.

40. A method as recited in claim 39, wherein, when the image at the primary image position changes in response to the user input, the order of the entries in the list being displayed changes such that the at least one entry in the list associated with the image in the primary image position is displayed at the top of the list.

* * * * *